US010642860B2

(12) United States Patent
Schaefer et al.

(10) Patent No.: US 10,642,860 B2
(45) Date of Patent: May 5, 2020

(54) LIVE MIGRATION OF DISTRIBUTED DATABASES

(71) Applicant: ELECTRONIC ARTS INC., Redwood City, CA (US)

(72) Inventors: Greg William Schaefer, Minneapolis, MN (US); Anand Nair, Atlanta, GA (US); Shengyong Li, Redwood City, CA (US); MengXin Ye, Redwood City, CA (US); Xin Feng Zhang, Shanghai (CN); Miao Xiong, Shanghai (CN); Jian Zhou, Shanghai (CN)

(73) Assignee: Electronic Arts Inc., Redwood City, CA (US)

( * ) Notice: Subject to any disclaimer, the term of this patent is extended or adjusted under 35 U.S.C. 154(b) by 386 days.

(21) Appl. No.: 15/173,103

(22) Filed: Jun. 3, 2016

(65) Prior Publication Data

US 2017/0351702 A1 Dec. 7, 2017

(51) Int. Cl.
*G06F 16/27* (2019.01)

(52) U.S. Cl.
CPC .................. *G06F 16/27* (2019.01)

(58) Field of Classification Search
CPC ......... G06F 17/30221; G06F 17/30194; G06F 17/30079; G06F 16/27
USPC ........................................ 707/634
See application file for complete search history.

(56) References Cited

U.S. PATENT DOCUMENTS

| 7,165,129 B1 * | 1/2007 | Okmianski | G06F 12/0868 710/52 |
| 7,765,189 B2 * | 7/2010 | Yamakawa | G06F 17/30153 707/640 |
| 8,150,870 B1 * | 4/2012 | Peddy | G06F 17/30584 707/770 |
| 8,407,182 B1 * | 3/2013 | Rajaa | G06F 17/30079 707/610 |
| 8,429,162 B1 | 4/2013 | Wang et al. | |
| 8,738,624 B1 | 5/2014 | Wang et al. | |
| 9,356,793 B1 * | 5/2016 | Drobychev | H04L 43/0876 |
| 9,384,227 B1 * | 7/2016 | Xiao | G06F 16/278 |

(Continued)

*Primary Examiner* — Shiow-Jy Fan
(74) *Attorney, Agent, or Firm* — Lowenstein Sandler LLP

(57) ABSTRACT

An example method of live migration of distributed databases may include implementing a first intermediate database access mode with respect to a distributed database to be migrated from an original set of storage servers to a destination set of storage servers, wherein, in the first database access mode, database read requests are routed to the original set of storage servers and database update requests are routed to both the original set of storage servers and the destination set of storage servers. The method may further include copying a plurality of records of the distributed database from the original set of storage servers to the destination set of storage servers. The method may further include switching to a second intermediate database access mode, in which database read requests are routed to the destination set of storage servers and database update requests are routed to both the original set of storage servers and the destination set of storage servers. The method may further include switching to a post-migration database access mode, in which database read and update requests are routed to the destination set of storage servers.

20 Claims, 5 Drawing Sheets

(56) References Cited

U.S. PATENT DOCUMENTS

| | | | |
|---|---|---|---|
| 2003/0115438 A1* | 6/2003 | Mahalingam | G06F 17/30079 |
| | | | 712/1 |
| 2005/0050054 A1* | 3/2005 | Clark | G06F 17/30174 |
| 2006/0288048 A1* | 12/2006 | Kamohara | G06F 17/30079 |
| 2007/0083575 A1* | 4/2007 | Leung | G06F 17/30082 |
| 2007/0294319 A1* | 12/2007 | Mankad | G06F 11/1662 |
| 2008/0059746 A1* | 3/2008 | Fisher | G06F 9/5088 |
| | | | 711/165 |
| 2009/0249005 A1* | 10/2009 | Bender | G06F 11/1435 |
| | | | 711/162 |
| 2012/0254175 A1 | 10/2012 | Horowitz et al. | |
| 2013/0054520 A1* | 2/2013 | Sampathkumar | G06F 3/0617 |
| | | | 707/610 |
| 2013/0054530 A1* | 2/2013 | Baker | G06F 17/30079 |
| | | | 707/639 |
| 2013/0290249 A1 | 10/2013 | Merriman et al. | |
| 2014/0006342 A1* | 1/2014 | Love | G06F 17/30345 |
| | | | 707/609 |
| 2014/0122510 A1 | 5/2014 | Namkoong et al. | |
| 2015/0058289 A1* | 2/2015 | Do | G06F 17/303 |
| | | | 707/613 |
| 2015/0237157 A1 | 8/2015 | Wang | |
| 2017/0116232 A1* | 4/2017 | Marwah | G06F 16/217 |

\* cited by examiner

LIVE MIGRATION OF DISTRIBUTED DATABASES

TECHNICAL FIELD

The present disclosure is generally related to distributed databases, and is more specifically related to implementing live migration of distributed databases.

BACKGROUND

Contents of a distributed database may reside on a plurality of storage servers. In an illustrative example, a distributed database may be represented by a horizontally partitioned database, in which plurality of database records are split between multiple storage servers based on, e.g., a primary key. A horizontal database partition may be referred to as a "shard," and a horizontally partitioned database may be referred to as "sharded database." In another illustrative example, a distributed database may be represented by a vertically partitioned database, in which the database tables are split by columns, such that each database record would be distributed over multiple storage servers.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
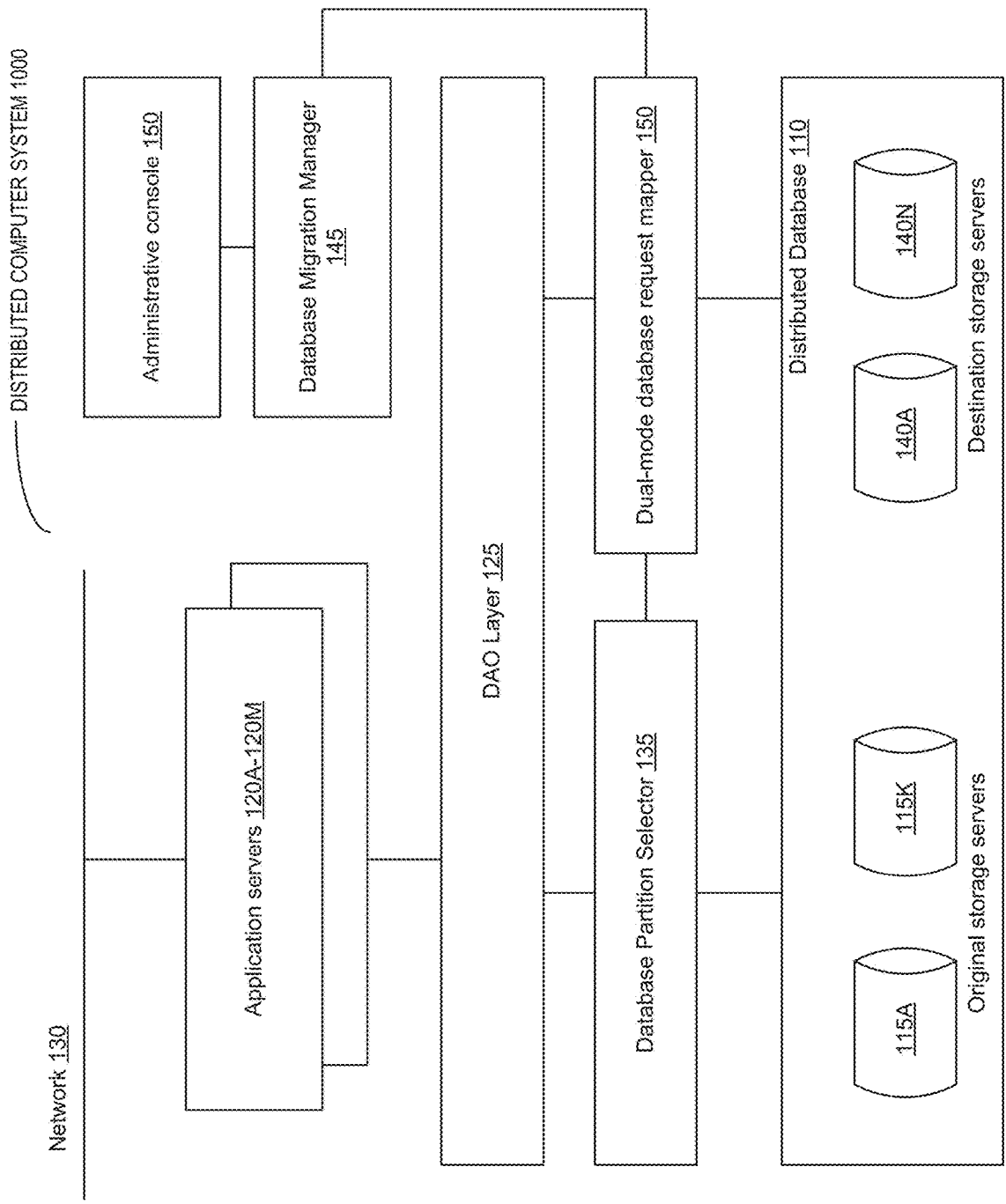
FIG. 1 schematically illustrates a high-level network diagram of an example distributed computer system operating in accordance with one or more aspects of the present disclosure.

Described herein are methods and systems for implementing live migration of distributed databases with zero downtime, no data loss, and no adverse impact on the user-facing applications that utilize such databases. In an illustrative example, a distributed database residing on an original pool of storage servers may be migrated to a new pool of storage servers. Such migration may be performed in support of a scale-out effort, a hardware upgrade operation, a data center physical migration, or for various other reasons.

In certain implementations, the distributed database being migrated may be employed by one or more user-facing applications, such as online gaming or business applications. Access to the database by the application servers may be facilitated by a data access object (DAO) layer, which may export an application programming interface (API) for accessing the objects stored by the distributed database. The DAO layer may translate the API calls to a database access commands (such as Structured Query Language (SQL) commands) and then forward the resulting datasets to the application that have issued the corresponding API call.

In certain implementations, the distributed database may be represented by a horizontally partitioned database, in which plurality of database records are split between multiple storage servers based on, e.g., a primary key. Alternatively, the distributed database may be represented by a vertically partitioned database, in which the database tables are split by columns, such that each database record would be distributed over multiple storage servers. A database partition selector software component may be employed to route a database access commands to a storage server storing the corresponding database partition (e.g., a database shard), as described in more details herein below.

While conventional database migration methods may involve a downtime and/or may otherwise adversely affect the user-facing applications, embodiments of the present disclosure may provide zero-downtime database migration which minimally impacts the front-end traffic (i.e., application-initiated database transactions). In accordance with one or more aspects of the present disclosure, the migration process may be facilitated by various software components, including a migration manager software component and a dual-mode database request mapper software component. The migration manager may implement a workflow that coordinates activities of various software components and direct the phase transitions of the migration process, while the dual mode database request mapper may be employed for routing database access requests to the original and/or destination storage servers.

Before commencing the migration process, all database requests, including read (such as SQL SELECT commands) and modification requests (such as SQL INSERT, UPDATE, and DELETE command) are routed to the original pool of storage servers. The migration manager may initiate the migration process by causing the dual mode database request mapper to transition to a first intermediate database access mode, in which all database read requests are routed to the original pool of storage servers, while all database modification requests are routed to both original and destination pool of storage servers.

While operating in the first intermediate database access mode, the migration manager may initiate a background job to copy the database contents from the original storage servers to the destination storage servers. In certain implementations, the rate of copying the database contents from the original storage servers to the destination storage servers may be adjusted based on the front-end (i.e., application-initiated) database access rate, in order to minimize the adverse effect of the background migration job on the frontend transaction rate, as described in more details herein below.

Responsive to completing the background copying job, the migration manager may cause the dual mode database request mapper to transition to a second intermediate database access mode, in which all database read requests are routed to the destination pool of storage servers, while all database modification requests are still routed to both original and destination pool of storage servers. The purpose of the second intermediate database access mode is to complete all the tests that may be necessary to ascertain that the entire database contents has been successfully migrated from the original storage servers to the destination storage servers and to further ascertain the normal performance of the destination pool of storage servers in servicing the read and update requests, as described in more details herein below.

Various aspects of the above referenced methods and systems are described in details herein below by way of examples, rather than by way of limitation.

FIG. 1 schematically illustrates a high-level network diagram of an example distributed computer system 1000 operating in accordance with one or more aspects of the present disclosure. Computer systems, appliances, and network segments are shown in FIG. 1 for illustrative purposes only and do not in any way limit the scope of the present disclosure. Certain infrastructure elements, such as load balancers, firewalls, secure socket layer (SSL) offloaders, routers, and/or switches, are omitted from FIG. 1 for clarity. Various other computer systems, components, appliances, and/or methods of their interconnection may be compatible with the methods and systems for implementing live migration of distributed databases that are implemented in accordance with one or more aspects of the present disclosure.

In the illustrative example of FIG. 1, a distributed database 110 may reside on a pool of storage servers 115A-115K. The storage servers 115A-115K may implement file storage, block storage, and/or object storage. The configuration of the distributed database 110 may be stored in a persistent memory (e.g., in one or more files), and may at least partially be cached by other components of the example distributed computer system 1000.

The distributed database 110 may be employed by one or more user-facing applications, such as online gaming or business applications, running on one or more application servers 120A-120M. The application servers 120A-120M may be accessed by a plurality of clients over a network 130, e.g., via one or more Hypertext Transfer Protocol (HTTP) or Representational State Transfer (REST) servers, which are omitted from FIG. 1 for clarity. The network 130 may comprise one or more local area networks and/or one or more wide area networks (e.g., the Internet).

Access to the database by the application servers 120A-120M may be facilitated by a data access object (DAO) layer 125, which may export an application programming interface (API) for accessing the objects stored by the distributed database. The DAO layer 125 may translate the API calls to a database access commands (such as Structured Query Language (SQL) commands) and then return the resulting datasets to the application that have issued the corresponding API call. In certain implementations, the DAO layer 125 may be implemented by one or more software components running on a dedicated hardware server (omitted from FIG. 1 for clarity). Alternatively, one or more software components implementing the functionality of the DAO layer 125 may be co-located with other software components of the distributed system 1000.

In an illustrative example, the distributed database 110 may be represented by a horizontally partitioned database, in which plurality of database records are split between the storage servers 115A-115K based on, e.g., a primary key. Alternatively, the distributed database may be represented by a vertically partitioned database, in which the database tables are split by columns, such that each database record would be distributed over multiple storage servers. In an illustrative example, the partition identifier may be derived from the column identifier of the database record to be accessed by applying a pre-determined mapping function to the column identifier.

The database partition selector software component 135 may be employed to route database access commands to a storage server 115A-115K storing the corresponding database partition (e.g., a database shard). In certain implementations, the database partition selector 135 may be implemented by one or more software components running on a dedicated hardware server (omitted from FIG. 1 for clarity). Alternatively, one or more software components implementing the functionality of the database partition selector 135 may be co-located with other software components of the distributed system 1000.

In an illustrative example, the database partition selector software component 135 may derive the partition identifier from the primary key of the database record to be accessed, by applying a pre-determined hash function to the primary key. In another illustrative example, for numeric primary keys, the partition identifier may be derived from the primary key of the database record to be accessed by dividing the primary key value by a pre-determined integer value, which may reflect the number of records in each partition. In yet another illustrative example, for numeric primary keys, the partition identifier may be provided by the value of the primary key of the database record modulo a pre-determined integer value, which may reflect the number of records in each partition, where the modulo operation the modulo operation finds the remainder after division of the value of the primary key of the database record by the pre-determined integer value.

While, in the illustrative example of FIG. 1, the database partition selector 135 is shown as a component that is separate from the DAO layer 125, in various illustrative examples the functionality of the database partition selector 135 may be implemented by the same software component that implements the DAO layer 125.

In accordance with one or more aspects of the present disclosure, the distributed database 110 may need to be migrated to the destination pool of storage servers 140A-140N. Such migration may be performed in support of a scale-out effort, a hardware upgrade operation, a data center physical migration, or for various other reasons. The migration process may be facilitated by a migration manager 145 implement a workflow that coordinates activities of various software components and direct the phase transitions of the migration process, as described in more details herein below.

In certain implementations, the migration manager 145 may be implemented by one or more software components running on a dedicated hardware server (omitted from FIG. 1 for clarity). Alternatively, one or more software components implementing the functionality of the migration manager 145 may be co-located with other software components of the distributed system 1000.

The migration manager 145 may be accessible by a system administrator via an administrative console 150 that may implement a graphical user interface (GUI) for receiving administrative commands and/or graphically representing component statuses and progress reports with respect to functioning of various components of the distributed computer system 100 implementing the database migration workflow.

The migration manager 145 may control a dual-mode database request mapper software component 150 that may be employed for directing the database requests to the original storage servers 115A-115K and/or destination storage servers 140A-140N, depending upon the database access mode that is currently selected by the migration manager 145, as described in more details herein below. While, in the illustrative example of FIG. 1, the database request mapper software component 150 is shown as a component that is separate from the database partition selector 135 and the DAO layer 125, in various illustrative examples the functionality of the database request mapper 150 may be merged into the database partition selector 135 and/or the DAO layer 125. In certain implementations, the database request mapper 150 may be implemented by one or more software components running on a dedicated hardware server (omitted from FIG. 1 for clarity). Alternatively, one or more software components implementing the functionality of the database request mapper 150 may be co-located with other software components of the distributed system 1000.

Figure 2:
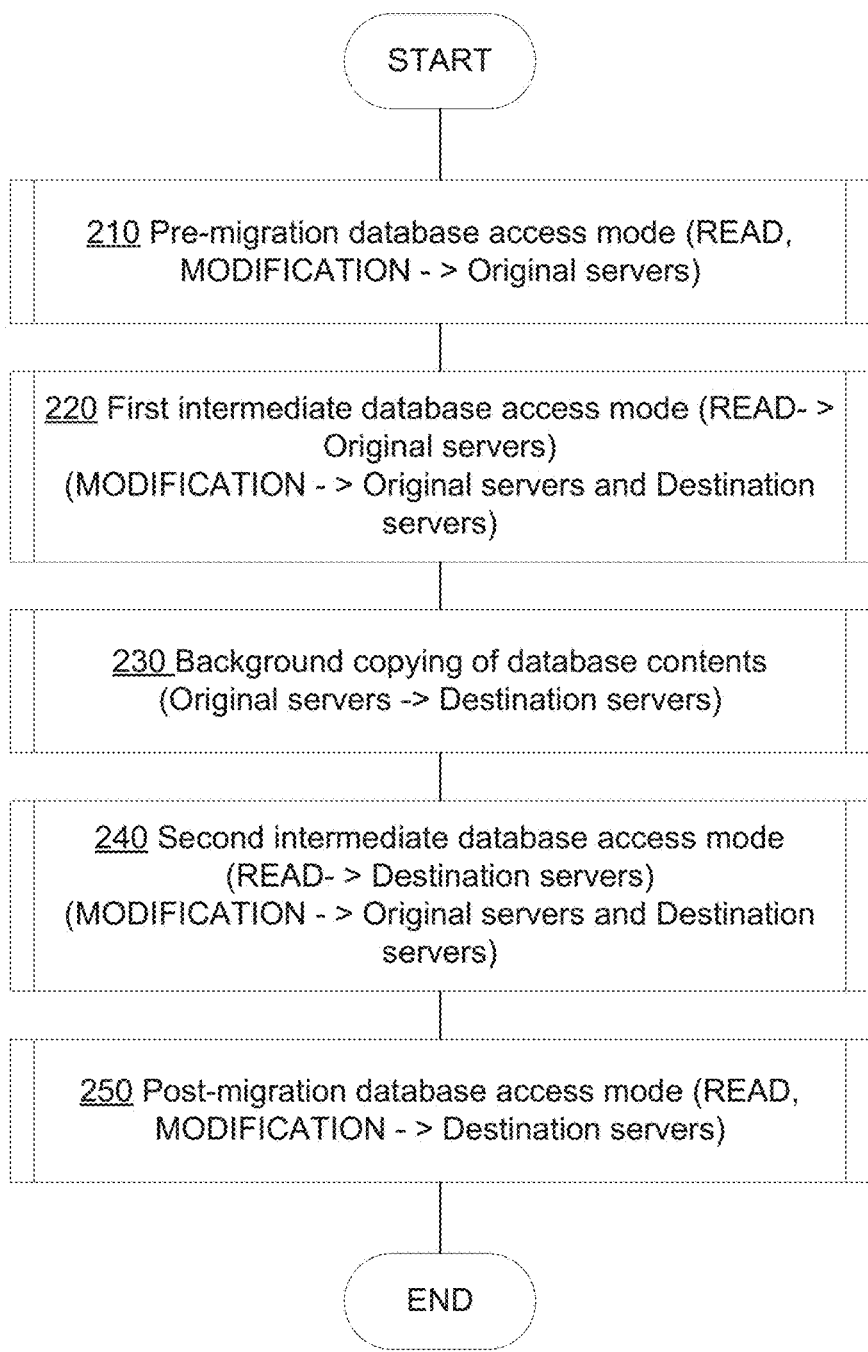
FIG. 2 schematically illustrates a migration workflow implemented by a migration manager operating in accordance with one or more aspects of the present disclosure.

The migration workflow implemented by the migration manager 145 is schematically illustrated by FIG. 2. In the pre-migration database access mode 210, all database requests, including read (such as SQL SELECT commands) and modification requests (such as SQL INSERT, UPDATE, and DELETE command) are routed to the original storage servers 115A-115K.

The migration manager 145 may initiate the migration process by causing the dual mode database request mapper 150 to implement a first intermediate database access mode 220, in which all database read requests are routed to the original storage servers 115A-115K, while all database modification requests are routed to both original storage servers 115A-115K and destination storage servers 140A-140N. The dual-write feature of the first intermediate database access mode 220 makes sure that all the data on the destination storage servers is synchronized with any updates that may occur while the database content copying operation is performed.

Figure 3:
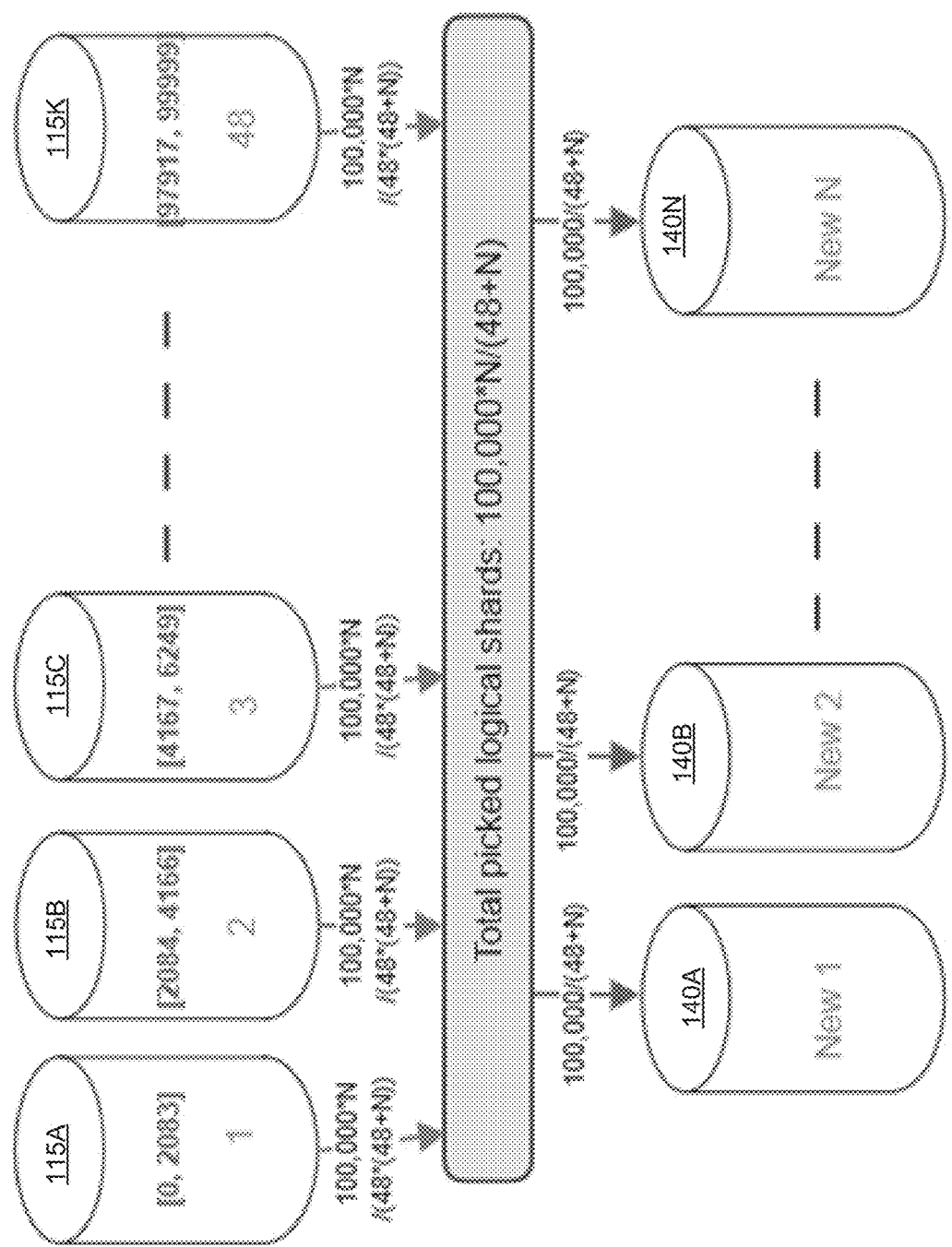
FIG. 3 schematically illustrates an example of evenly allocating the partitions of a distributed database to the destination pool of storage servers, in accordance with one or more aspects of the present disclosure.

In certain implementations, the number of destination storage servers 140A-140N may differ from the number of the original storage servers 115A-115K. For example, if the database migration is performed in support of a scale-out effort, the number of destination storage servers 140A-140N would exceed the number of the original storage servers 115A-115K, as schematically illustrated by FIG. 3. In the illustrative example of FIG. 3, the original pool of storage servers 115A-115K includes 48 servers, among which 100,000 logical partitions ("shards") are evenly distributed, so that 2084 shards are allocated of each of the 48 storage servers. The destinations set of storage servers 140A-140N includes 48+N servers, such that each server would store 100,000/(48+N) shards of the distributed database.

Thus, the ability of the migration process to support different numbers of storage servers within the origin pool of storage servers and the destination pool of storage servers allows to evenly distribute the logical partitions over the destination storage servers. The dual mode database request mapper 150 of FIG. 1 may be employed to identify, for each database access request, database partitions on the destination storage servers 140A-140N. In an illustrative example, the database partition identifier may be derived from the primary key of the database record to be accessed, by applying a pre-determined hash function to the primary key. In another illustrative example, for numeric primary keys, the partition identifier may be derived from the primary key of the database record to be accessed by dividing the primary key value by a pre-determined integer value, which may reflect the number of records in each partition.

Referring again to FIG. 2, while operating in the first intermediate database access mode 220, the migration manager 145 may initiate a background job 230 to copy the database contents from the original storage servers to the destination storage servers. In order to prevent a database record from being modified while it is being copied to a destination storage server, the migration manager 145 may acquire a lock with respect to each record before initiating the copying process, then copy the record, and finally release the lock after the record has been successfully copied.

In certain implementations, the rate of copying the database contents from the original storage servers 115A-115K to the destination storage servers 140A-140N may be adaptively adjusted based on the front-end (i.e., application-initiated) database access rate, in order to minimize the adverse effect of the background migration job on the frontend transaction rate. In an illustrative example, the rate of copying the database contents from the original storage servers 115A-115K to the destination storage servers 140A-140N may be adjusted based on a schedule specifying the times of the day in which the frontend transaction rate is expected to be low, and thus would be unaffected by the backend copying job. In another illustrative example, the rate of copying the database contents from the original storage servers 115A-115K to the destination storage servers 140A-140N may be dynamically throttled based on real-time measurements of the frontend transaction rate.

Responsive to completing the background copying job 230, the migration manager 145 may cause the dual mode database request mapper 150 to transition to a second intermediate database access mode 240, in which all database read requests are routed to the destination pool of storage servers, while all database modification requests are still routed to both original and destination pool of storage servers. The purpose of implementing the second intermediate database access mode 240 is to complete all the tests that may be necessary to ascertain that the entire database contents has been successfully from the original storage servers 115A-115K to the destination storage servers 140A-140N, and to further ascertain the normal performance of the destination pool of storage servers in servicing the read and update requests. Should any of the tests fail, the migration manager 145 may initiate a fallback procedure to return to the first intermediate database access mode 220 and to repeat the database contents copying operations. If the tests indicate the successful completion of the database contents copying job and normal operation of the destination pool of storage servers in servicing the read and update requests, the migration manager 145 may cause the dual mode database request mapper 150 to transition to the post-migration database access mode 250, in which all database requests, including read and modification requests, are routed to the destination pool of storage servers.

In certain implementations, upon transitioning to the post-migration database access mode 250, the migration manager may initiate deleting the data from the original pool of storage servers to satisfy the applicable data retention and security policy. Responsive to completing the data deletion operations, the migration database manager may cause the original pool of storage servers to be decommissioned and brought off-line.

Thus, the methods described herein provide live migration of a distributed database to a new pool of storage servers, with zero downtime and without adversely affecting the applications accessing the database. Implementing the migration in multiple stages, as described herein, significantly improves the reliability of the migration process, by allowing to roll back the migration process in the event of failure of any of the tests that are performed to ascertain the data consistency and integrity.

Figure 4:
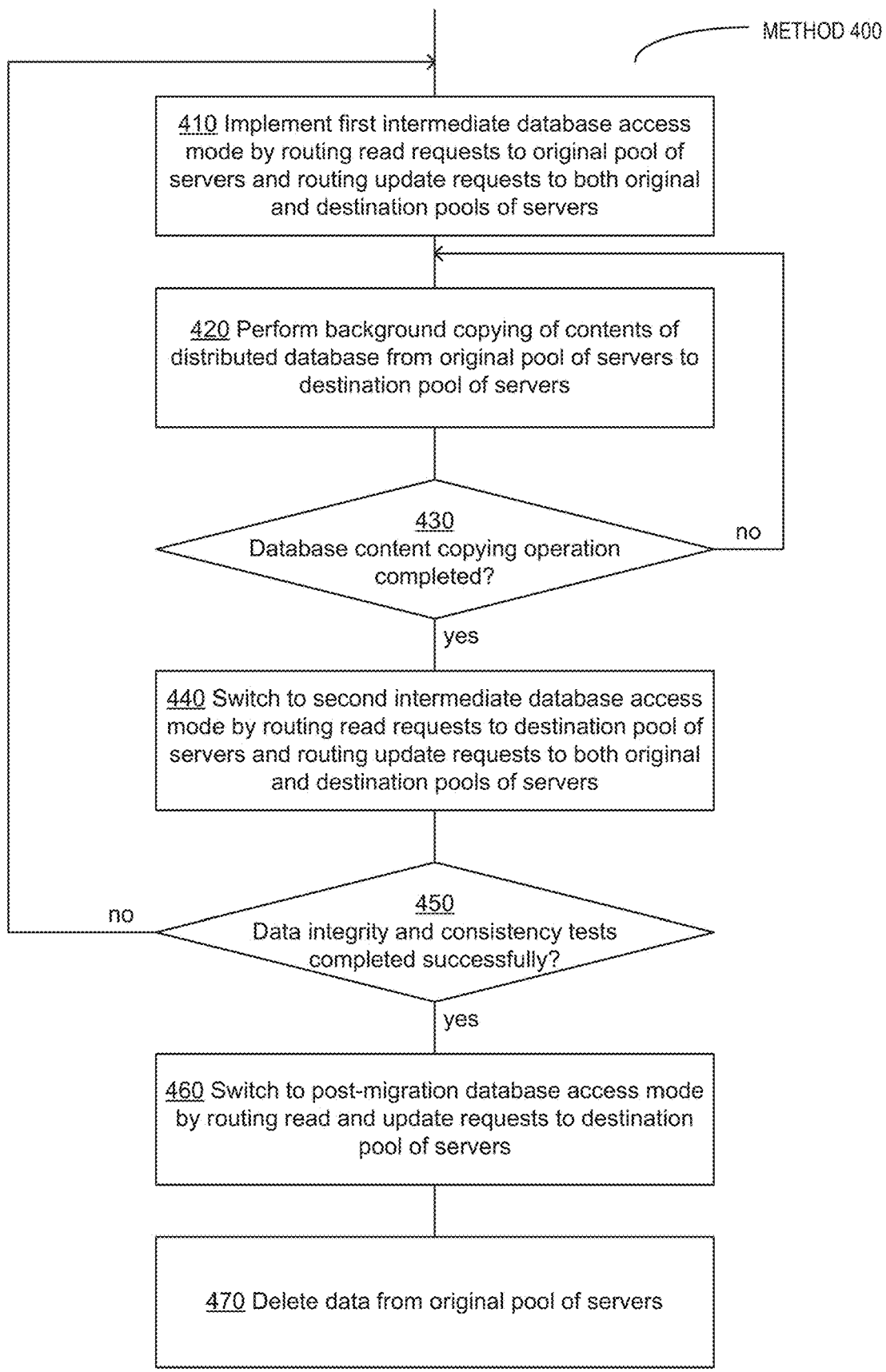
FIG. 4 depicts a flow diagram of an example method of live migration of distributed databases, in accordance with one or more aspects of the present disclosure.

FIG. 4 depicts a flowchart of an example method 400 of live migration of distributed databases, in accordance with one or more aspects of the present disclosure. Method 400 and/or each of its individual functions, routines, subroutines, or operations may be performed by one or more general purpose and/or specialized processing devices. In certain implementations, certain operations of the method 400 may be performed by various elements of the example distributed database infrastructure described herein above with references to FIG. 1. Two or more functions, routines, subroutines, or operations of the method 400 may be performed in parallel or in an order which may differ from the order described above. In certain implementations, the method 400 may be implemented by a single processing thread. Alternatively, the method 400 may be implemented by two or more processing threads, each thread executing one or more individual functions, routines, subroutines, or operations of the method. In an illustrative example, the processing threads implementing the method 400 may be synchronized (e.g., using semaphores, critical sections, and/or other thread synchronization mechanisms). Alternatively, the processing threads implementing the method 400 may be executed asynchronously with respect to each other.

At block 410, a processing device implementing the method of live migration of distributed databases may implement a first intermediate database access mode with respect to a distributed database to be migrated from an original pool of storage servers to a destination pool of storage servers. In the first database access mode, database read requests are routed to the original pool of storage servers and database modification requests are routed to both the original pool of storage servers and the destination pool of storage servers, as described in more details herein above.

At block 420, the processing device may perform background copying of the contents of the distributed database from the original pool of storage servers to the destination pool of storage servers, as described in more details herein above.

Responsive to determining, at block 430, that the database content copying operations have been completed, the processing device may, at block 440, switch to a second intermediate database access mode, in which database read requests are routed to the destination pool of storage servers and database update requests are routed to both the original pool of storage servers and the destination pool of storage servers, as described in more details herein above.

Responsive to ascertaining, at block 450, the integrity and consistency of the data residing at the destination pool of storage servers, the processing device may, at block 460, switch to a post-migration database access mode, in which database read and update requests are routed to the destination pool of storage servers, as described in more details herein above.

At block 470, the processing device may delete the data from the original pool of storage servers to satisfy the applicable data retention and security policy, and the method may terminate.

Figure 5:
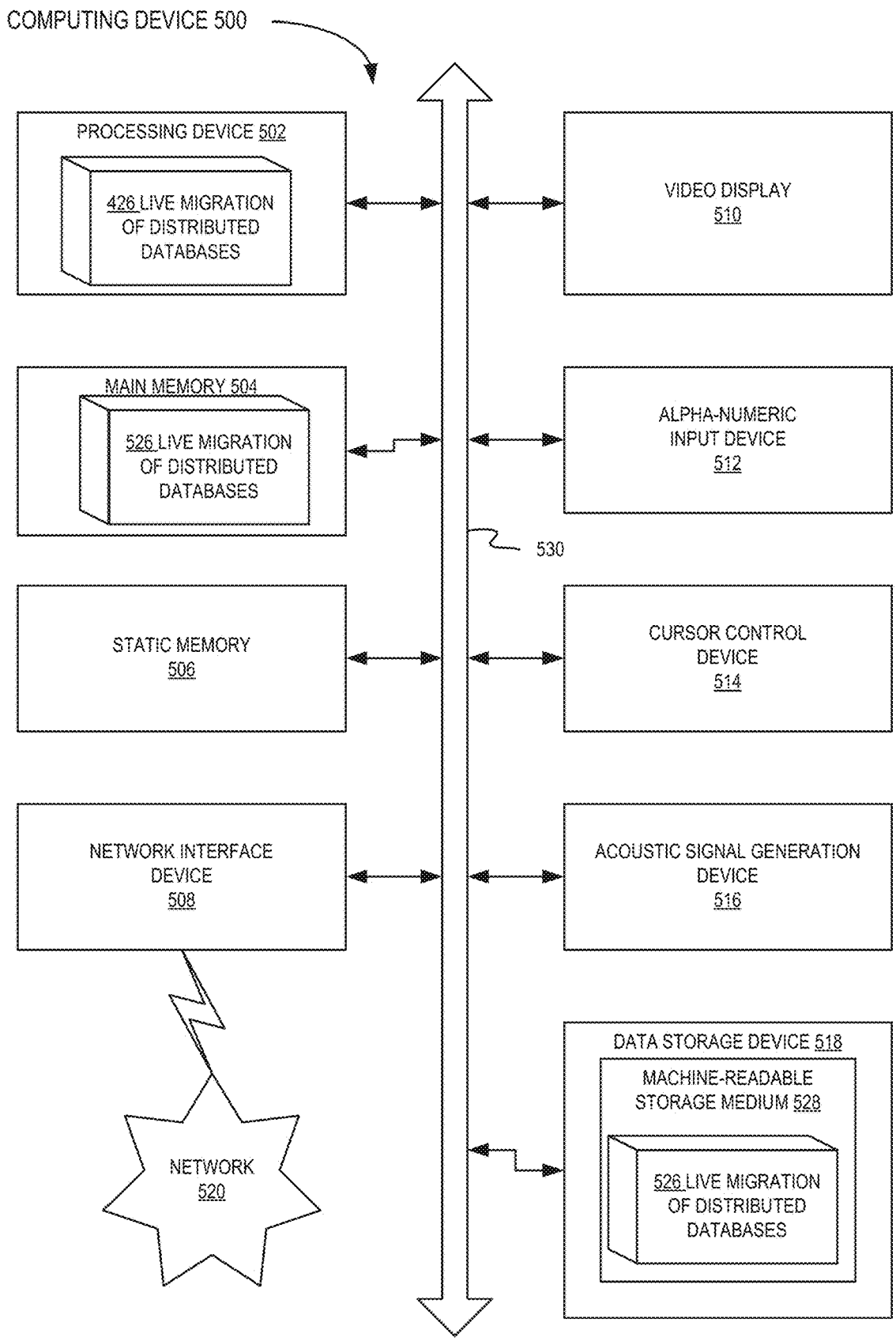
FIG. 5 depicts a block diagram of an illustrative computing device operating in accordance with one or more aspects of the present disclosure.

FIG. 5 illustrates a diagrammatic representation of a computing device 500, which may implement the systems and methods described herein. The computing device 500 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor) 502, a main memory 504 (e.g., synchronous dynamic random access memory (DRAM), read-only memory (ROM)), a static memory 506 (e.g., flash memory and a data storage device 518), which may communicate with each other via a bus 530.

The processing device 502 may be provided by one or more general-purpose processing devices such as a microprocessor, central processing unit, or the like. In an illustrative example, the processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also comprise one or more special-purpose processing devices such as an application specific integrated circuit (ASIC), a field programmable gate array (FPGA), a digital signal processor (DSP), network processor, or the like. The processing device 502 may be configured to execute a database migration manager software component implementing the method 400 of live migration of distributed databases, in accordance with one or more aspects of the present disclosure, for performing the operations and steps discussed herein.

The computing device 500 may further include a network interface device 508 which may communicate with a network 520. The computing device 500 also may include a video display unit 510 (e.g., a liquid crystal display (LCD) or a cathode ray tube (CRT)), an alphanumeric input device 512 (e.g., a keyboard), a cursor control device 515 (e.g., a mouse) and an acoustic signal generation device 516 (e.g., a speaker). In one embodiment, the video display unit 510, the alphanumeric input device 512, and the cursor control device 514 may be combined into a single component or device (e.g., an LCD touch screen).

The data storage device 518 may include a computer-readable storage medium 528 on which may be stored one or more sets of instructions, e.g., instructions 526 of database migration manager implementing the method 400 of live migration of distributed databases, in accordance with one or more aspects of the present disclosure. The instructions 526 may also reside, completely or at least partially, within the main memory 504 and/or within the processing device 402 during execution thereof by the computing device 500, the main memory 505 and the processing device 502 also constituting computer-readable media. The instructions may further be transmitted or received over the network 520 via the network interface device 508.

While the computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "implementing", "copying", "switching", "routing", "deleting", "adjusting", "acquiring," "releasing" or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
   implementing, by a processing device, a first intermediate database access mode with respect to a distributed database to be migrated from an original set of storage servers to a destination set of storage servers, wherein, in the first intermediate database access mode, a plurality of records of the distributed database are copied from the original set of storage servers to the destination set of storage servers;
   dynamically adjusting a rate of the copying operation based on real-time measurements of a frontend transaction rate of the distributed database;
   receiving, in the first intermediate database access mode, a database update request comprising a primary key;
   identifying, by applying a first hash function to the primary key, a first storage server of the original set of storage servers;
   identifying, by applying a second hash function to the primary key, a second storage server of the original set of storage servers;
   routing the database update request to the first storage server and the second storage server;
   switching, by the processing device, to a second intermediate database access mode, in which database read requests are routed to the destination set of storage servers and database update requests are routed to both the original set of storage servers and the destination set of storage servers; and
   switching, by the processing device, to a post-migration database access mode, in which database read and update requests are routed to the destination set of storage servers.

2. The method of claim 1, wherein switching to the second intermediate database access mode is performed responsive to completing the copying operation.

3. The method of claim 1, wherein switching to the post-migration database access mode is performed responsive to successfully evaluating a data stabilization condition with respect to the destination set of storage servers.

4. The method of claim 1, wherein the distributed database is provided by a horizontally partitioned database.

5. The method of claim 1, further comprising:
   deleting the plurality of records of the distributed database from the original set of storage servers.

6. The method of claim 1, wherein copying the plurality of records of the distributed database further comprises:
   acquiring a lock with respect to a record of the plurality of records;
   copying the record to a storage server of the destination set of storage servers; and
   releasing the lock with respect to the record.

7. The method of claim 1, wherein the original set of storage servers comprises a first number of storage servers and the destination set of storage servers comprises a second number of storage servers, wherein the second number exceeds the first number.

8. The method of claim 1, wherein a plurality of logical database partitions are evenly distributed over the destination set of storage servers.

9. The method of claim 1, further comprising:
   dynamically adjusting, in the first intermediate database access mode, the rate of the copying operation based on a schedule specifying one or more periods of time characterized by low frontend transaction rates.

10. The method of claim 1, further comprising:
    responsive to determining, in the second intermediate database access mode, that entire database contents have not been copied from the original set of storage servers to the destination set of storage servers, switching to the first intermediate database access mode.

11. A system, comprising: a memory to store a distributed database configuration; a processing device, operatively coupled to the memory, the processing device to:
    implement a first intermediate database access mode with respect to a distributed database to be migrated from an original set of storage servers to a destination set of storage servers, wherein, in the first intermediate database access mode, a plurality of records of the distributed database are copied from the original set of storage servers to the destination set of storage servers;
    dynamically adjust a rate of the copying operation based on real-time measurements of a frontend transaction rate of the distributed database;
    receive, in the first intermediate database access mode, a database update request comprising a primary key;
    identify, by applying a first hash function to the primary key, a first storage server of the original set of storage servers;
    identify, by applying a second hash function to the primary key, a second storage server of the original set of storage servers;
    route the database update request to the first storage server and the second storage server;
    switch to a second intermediate database access mode, in which database read requests are routed to the destination set of storage servers and database update requests are routed to both the original set of storage servers and the destination set of storage servers; and switch to a post-migration database access mode, in which database read and update requests are routed to the destination set of storage servers.

12. The system of claim 11, wherein the processing device is to switch to the second intermediate database access mode responsive to completing the copying operation.

13. The system of claim 11, wherein the processing device is to switch to the post-migration database access mode is performed responsive to successfully evaluating a data stabilization condition with respect to the destination set of storage servers.

14. The system of claim 11, wherein the distributed database is provided by a horizontally partitioned database.

15. The system of claim 11, wherein the processing device is further to:

delete the plurality of records of the distributed database from the original set of storage servers.

16. The system of claim 11, wherein to copy the plurality of records of the distributed database to the destination set of storage servers, the processing device is further to:

acquire a lock with respect to a record of the plurality of records;

copy the record to a storage server of the destination set of storage servers; and release the lock with respect to the record.

17. The system of claim 11, wherein the original set of storage servers comprises a first number of storage servers and the destination set of storage servers comprises a second number of storage servers, wherein the second number exceeds the first number.

18. A computer-readable non-transitory storage medium comprising executable instructions that, when executed by a processing device, cause the processing device to:

implement a first intermediate database access mode with respect to a distributed database to be migrated from an original set of storage servers to a destination set of storage servers, wherein, in the first intermediate database access mode, a plurality of records of the distributed database are copied from the original set of storage servers to the destination set of storage servers;

dynamically adjusting a rate of the copying operation based on real-time measurements of a frontend transaction rate of the distributed database;

receive, in the first intermediate database access mode, a database update request comprising a primary key;

identify, by applying a first hash function to the primary key, a first storage server of the original set of storage servers;

identify, by applying a second hash function to the primary key, a second storage server of the original set of storage servers;

route the database update request to the first storage server and the second storage server;

switch to a second intermediate database access mode, in which database read requests are routed to the destination set of storage servers and database update requests are routed to both the original set of storage servers and the destination set of storage servers; and switch to a post-migration database access mode, in which database read and update requests are routed to the destination set of storage servers.

19. The computer-readable non-transitory storage medium of claim 18, wherein the distributed database is provided by a horizontally partitioned database.

20. The computer-readable non-transitory storage medium of claim 19, further comprising executable instructions to cause the processing device to:

acquire a lock with respect to a record of the plurality of records;

copy the record to a storage server of the destination set of storage servers; and release the lock with respect to the record.

* * * * *